(12) United States Patent
Dorwin

(10) Patent No.: US 9,223,988 B1
(45) Date of Patent: Dec. 29, 2015

(54) EXTENDING BROWSER FUNCTIONALITY WITH DYNAMIC ON-THE-FLY DOWNLOADING OF UNTRUSTED BROWSER COMPONENTS

(71) Applicant: Google Inc., Mountain View, CA (US)

(72) Inventor: David Kimbal Dorwin, Kirkland, WA (US)

(73) Assignee: Google Inc., Mountain View, CA (US)

( * ) Notice: Subject to any disclaimer, the term of this patent is extended or adjusted under 35 U.S.C. 154(b) by 162 days.

(21) Appl. No.: 13/691,144

(22) Filed: Nov. 30, 2012

Related U.S. Application Data

(60) Provisional application No. 61/569,755, filed on Dec. 12, 2011.

(51) Int. Cl.
| | |
|---|---|
| *G06F 21/00* | (2013.01) |
| *G06F 21/60* | (2013.01) |
| *G06F 21/10* | (2013.01) |
| *G11B 20/00* | (2006.01) |

(52) U.S. Cl.
CPC ............... *G06F 21/60* (2013.01); *G06F 21/10* (2013.01); *G11B 20/00086* (2013.01)

(58) Field of Classification Search
None
See application file for complete search history.

(56) References Cited

U.S. PATENT DOCUMENTS

| | | | |
|---|---|---|---|
| 4,535,355 A | 8/1985 | Arn et al. | |
| 4,694,489 A | 9/1987 | Frederiksen | |
| 5,067,035 A | 11/1991 | Kudelski et al. | |
| 5,134,656 A | 7/1992 | Kudelski | |
| 5,144,663 A | 9/1992 | Kudelski et al. | |
| 5,191,611 A | 3/1993 | Lang | |
| 5,339,413 A | 8/1994 | Koval et al. | |
| 5,375,168 A | 12/1994 | Kudelski | |
| 5,392,351 A | 2/1995 | Hasebe et al. | |
| 5,487,167 A | 1/1996 | Dinallo et al. | |

(Continued)

FOREIGN PATENT DOCUMENTS

| | | |
|---|---|---|
| EP | 0658054 A2 | 6/1995 |
| EP | 0714204 A2 | 5/1996 |

(Continued)

OTHER PUBLICATIONS

"A new approach to browser security: the Google Chrome Sandbox," Chromium Blog, http://blog.chromium.org/2008/10/new-approach-to-browser-security-google.html, 5 pages, Oct. 2, 2008.

(Continued)

*Primary Examiner* — Abu Sholeman
*Assistant Examiner* — Maung Lwin
(74) *Attorney, Agent, or Firm* — Fenwick & West LLP

(57) ABSTRACT

Subject innovations enable a client device to dynamically download Digital Rights Management components, and/or other plug-ins, to extend a browser functionality, where the downloading places the downloaded component(s) within a super sandbox that, inter alia, disables selected operating system calls by the downloaded component, performs one or more heuristic analysis on code execution of the component to detect possible malicious code, and restricts output through the super sandbox to those responses that are in response to a request to the component, rather than output that the component might have initiated 'on its own.' In some embodiments, a webpage is configured to include instructions to automatically download and install the component, thereby minimizing user actions to directly request and/or install the component.

20 Claims, 5 Drawing Sheets

(56) References Cited

U.S. PATENT DOCUMENTS

| | | | |
|---|---|---|---|
| 5,539,450 A | 7/1996 | Handelman | |
| 5,590,200 A | 12/1996 | Nachman et al. | |
| 5,592,212 A | 1/1997 | Handelman | |
| 5,621,799 A | 4/1997 | Katta et al. | |
| 5,640,546 A | 6/1997 | Gopinath et al. | |
| 5,666,412 A | 9/1997 | Handelman et al. | |
| 5,684,876 A | 11/1997 | Pinder et al. | |
| 5,758,257 A | 5/1998 | Herz et al. | |
| 5,774,527 A | 6/1998 | Handelman et al. | |
| 5,774,546 A | 6/1998 | Handelman et al. | |
| 5,799,089 A | 8/1998 | Kuhn et al. | |
| 5,805,705 A | 9/1998 | Gray et al. | |
| 5,870,474 A | 2/1999 | Wasilewski et al. | |
| 5,878,134 A | 3/1999 | Handelman et al. | |
| 5,883,957 A | 3/1999 | Moline et al. | |
| 5,892,900 A | 4/1999 | Ginter et al. | |
| 5,910,987 A | 6/1999 | Ginter et al. | |
| 5,915,019 A | 6/1999 | Ginter et al. | |
| 5,917,912 A | 6/1999 | Ginter et al. | |
| 5,920,625 A | 7/1999 | Davies | |
| 5,920,861 A | 7/1999 | Hall et al. | |
| 5,922,208 A | 7/1999 | Demmers | |
| 5,923,666 A | 7/1999 | Gledhill et al. | |
| 5,933,498 A | 8/1999 | Schneck et al. | |
| 5,939,975 A | 8/1999 | Tsuria et al. | |
| 5,943,422 A | 8/1999 | Van Wie et al. | |
| 5,949,876 A | 9/1999 | Ginter et al. | |
| 5,974,549 A * | 10/1999 | Golan | 726/23 |
| 5,982,891 A | 11/1999 | Ginter et al. | |
| 5,991,399 A | 11/1999 | Graunke et al. | |
| 6,009,116 A | 12/1999 | Bednarek et al. | |
| 6,009,401 A | 12/1999 | Horstmann | |
| 6,009,525 A | 12/1999 | Horstmann | |
| 6,021,197 A | 2/2000 | von Willich et al. | |
| 6,035,037 A | 3/2000 | Chaney | |
| 6,038,433 A | 3/2000 | Vegt | |
| 6,049,671 A | 4/2000 | Slivka et al. | |
| 6,055,503 A | 4/2000 | Horstmann | |
| 6,073,256 A | 6/2000 | Sesma | |
| 6,112,181 A | 8/2000 | Shear et al. | |
| 6,138,119 A | 10/2000 | Hall et al. | |
| 6,141,753 A | 10/2000 | Zhao et al. | |
| 6,157,721 A | 12/2000 | Shear et al. | |
| 6,160,891 A | 12/2000 | Al-Salqan | |
| 6,178,242 B1 | 1/2001 | Tsuria | |
| 6,185,683 B1 | 2/2001 | Ginter et al. | |
| 6,189,097 B1 | 2/2001 | Tycksen, Jr. et al. | |
| 6,191,782 B1 | 2/2001 | Mori et al. | |
| 6,226,618 B1 | 5/2001 | Downs et al. | |
| 6,226,794 B1 | 5/2001 | Anderson, Jr. et al. | |
| 6,237,786 B1 | 5/2001 | Ginter et al. | |
| 6,240,185 B1 | 5/2001 | Van Wie et al. | |
| 6,247,950 B1 | 6/2001 | Hallam et al. | |
| 6,253,193 B1 | 6/2001 | Ginter et al. | |
| 6,256,668 B1 | 7/2001 | Slivka et al. | |
| 6,272,636 B1 | 8/2001 | Neville et al. | |
| 6,285,985 B1 | 9/2001 | Horstmann | |
| 6,292,569 B1 | 9/2001 | Shear et al. | |
| 6,298,441 B1 | 10/2001 | Handelman et al. | |
| 6,311,221 B1 | 10/2001 | Raz et al. | |
| 6,314,409 B2 | 11/2001 | Schneck et al. | |
| 6,314,572 B1 | 11/2001 | LaRocca et al. | |
| 6,334,213 B1 | 12/2001 | Li | |
| 6,363,488 B1 | 3/2002 | Ginter et al. | |
| 6,385,596 B1 | 5/2002 | Wiser et al. | |
| 6,389,402 B1 | 5/2002 | Ginter et al. | |
| 6,405,369 B1 | 6/2002 | Tsuria | |
| 6,409,080 B2 | 6/2002 | Kawagishi | |
| 6,409,089 B1 | 6/2002 | Eskicioglu | |
| 6,415,031 B1 | 7/2002 | Colligan et al. | |
| 6,427,140 B1 | 7/2002 | Ginter et al. | |
| 6,449,367 B2 | 9/2002 | Van Wie et al. | |
| 6,449,719 B1 | 9/2002 | Baker | |
| 6,459,427 B1 | 10/2002 | Mao et al. | |
| 6,460,023 B1 | 10/2002 | Bean et al. | |
| 6,466,670 B1 | 10/2002 | Tsuria et al. | |
| 6,505,299 B1 | 1/2003 | Zeng et al. | |
| 6,587,561 B1 | 7/2003 | Sered et al. | |
| 6,618,484 B1 | 9/2003 | Van Wie et al. | |
| 6,629,243 B1 | 9/2003 | Kleinman et al. | |
| 6,633,918 B2 | 10/2003 | Agarwal et al. | |
| 6,634,028 B2 | 10/2003 | Handelman | |
| 6,640,304 B2 | 10/2003 | Ginter et al. | |
| 6,651,170 B1 | 11/2003 | Rix | |
| 6,654,420 B1 | 11/2003 | Snook | |
| 6,654,423 B2 | 11/2003 | Jeong et al. | |
| 6,658,568 B1 | 12/2003 | Ginter et al. | |
| 6,668,325 B1 | 12/2003 | Collberg et al. | |
| 6,792,113 B1 | 9/2004 | Ansell et al. | |
| 7,007,170 B2 | 2/2006 | Morten | |
| 7,165,175 B1 | 1/2007 | Kollmyer et al. | |
| 7,356,143 B2 | 4/2008 | Morten | |
| 7,578,002 B2 | 8/2009 | Risan et al. | |
| 7,640,435 B2 | 12/2009 | Morten | |
| 7,805,616 B1 | 9/2010 | Mohammed et al. | |
| 7,817,608 B2 | 10/2010 | Rassool et al. | |
| 7,827,613 B2 * | 11/2010 | Koved et al. | 726/26 |
| 7,953,882 B2 | 5/2011 | Shukla et al. | |
| 8,457,311 B1 * | 6/2013 | Schultz et al. | 380/210 |
| 8,560,642 B2 | 10/2013 | Pantos et al. | |
| 2002/0001385 A1 | 1/2002 | Kawada et al. | |
| 2002/0015498 A1 | 2/2002 | Houlberg et al. | |
| 2002/0021761 A1 | 2/2002 | Zhang et al. | |
| 2002/0021805 A1 | 2/2002 | Schumann et al. | |
| 2002/0049679 A1 | 4/2002 | Russell et al. | |
| 2002/0089410 A1 | 7/2002 | Janiak et al. | |
| 2002/0104004 A1 | 8/2002 | Couillard | |
| 2002/0107803 A1 | 8/2002 | Lisanke et al. | |
| 2002/0141582 A1 | 10/2002 | Kocher et al. | |
| 2003/0007568 A1 | 1/2003 | Hamery et al. | |
| 2003/0037261 A1 * | 2/2003 | Meffert et al. | 713/201 |
| 2003/0046568 A1 | 3/2003 | Riddick et al. | |
| 2003/0154265 A1 * | 8/2003 | Raffaele et al. | 709/221 |
| 2004/0031856 A1 | 2/2004 | Atsmon et al. | |
| 2004/0117500 A1 | 6/2004 | Lindholm et al. | |
| 2004/0151315 A1 | 8/2004 | Kim | |
| 2004/0184616 A1 | 9/2004 | Morten | |
| 2004/0230806 A1 | 11/2004 | Lisanke | |
| 2005/0027871 A1 | 2/2005 | Bradley et al. | |
| 2005/0066353 A1 | 3/2005 | Fransdonk | |
| 2005/0125358 A1 | 6/2005 | Levin et al. | |
| 2005/0193205 A1 | 9/2005 | Jacobs et al. | |
| 2005/0273862 A1 | 12/2005 | Benaloh et al. | |
| 2006/0020811 A1 | 1/2006 | Tan | |
| 2006/0212363 A1 | 9/2006 | Peinado et al. | |
| 2006/0225107 A1 * | 10/2006 | Seetharaman et al. | 725/100 |
| 2006/0280150 A1 | 12/2006 | Jha et al. | |
| 2007/0005795 A1 | 1/2007 | Gonzalez | |
| 2007/0067321 A1 * | 3/2007 | Bissett et al. | 707/100 |
| 2007/0089174 A1 * | 4/2007 | Bader et al. | 726/32 |
| 2007/0160208 A1 | 7/2007 | MacLean et al. | |
| 2007/0204300 A1 | 8/2007 | Markley et al. | |
| 2007/0209005 A1 | 9/2007 | Shaver et al. | |
| 2007/0219917 A1 | 9/2007 | Liu et al. | |
| 2007/0234291 A1 * | 10/2007 | Ronen et al. | 717/120 |
| 2007/0294170 A1 | 12/2007 | Vantalon et al. | |
| 2008/0027871 A1 | 1/2008 | Seo | |
| 2008/0052641 A1 | 2/2008 | Brown et al. | |
| 2008/0137848 A1 * | 6/2008 | Kocher et al. | 380/201 |
| 2008/0147671 A1 | 6/2008 | Simon et al. | |
| 2008/0155586 A1 | 6/2008 | Yang et al. | |
| 2008/0155673 A1 | 6/2008 | Jung et al. | |
| 2008/0267399 A1 | 10/2008 | Medvinsky et al. | |
| 2008/0288611 A1 | 11/2008 | Toyomura et al. | |
| 2008/0307454 A1 | 12/2008 | Ahanger et al. | |
| 2008/0313264 A1 | 12/2008 | Pestoni | |
| 2009/0006862 A1 * | 1/2009 | Alkove et al. | 713/189 |
| 2009/0007198 A1 | 1/2009 | Lavender et al. | |
| 2009/0031408 A1 | 1/2009 | Thom et al. | |
| 2009/0044008 A1 | 2/2009 | Lim | |
| 2009/0183001 A1 | 7/2009 | Lu et al. | |
| 2009/0197238 A1 * | 8/2009 | Moffatt et al. | 434/430 |
| 2009/0208016 A1 | 8/2009 | Choi et al. | |
| 2009/0249426 A1 | 10/2009 | Aoki et al. | |

(56) References Cited

U.S. PATENT DOCUMENTS

| | | | |
|---|---|---|---|
| 2010/0023760 | A1 | 1/2010 | Lee et al. |
| 2010/0027974 | A1 | 2/2010 | Ansari |
| 2010/0145794 | A1 | 6/2010 | Barger et al. |
| 2010/0180289 | A1 | 7/2010 | Barsook et al. |
| 2010/0199104 | A1* | 8/2010 | Van Rijnswou ............. 713/189 |
| 2010/0211776 | A1 | 8/2010 | Gunaseelan et al. |
| 2010/0235820 | A1* | 9/2010 | Khouzam et al. ............. 717/148 |
| 2010/0242097 | A1 | 9/2010 | Hotes et al. |
| 2010/0250532 | A1 | 9/2010 | Soroushian et al. |
| 2010/0299701 | A1 | 11/2010 | Liu et al. |
| 2011/0069936 | A1 | 3/2011 | Johnson et al. |
| 2011/0179283 | A1 | 7/2011 | Thom et al. |
| 2011/0225417 | A1 | 9/2011 | Maharajh et al. |
| 2011/0305273 | A1 | 12/2011 | He et al. |
| 2011/0314284 | A1 | 12/2011 | Chou |
| 2012/0066494 | A1 | 3/2012 | Lee et al. |
| 2012/0079578 | A1* | 3/2012 | Dachiraju et al. ................. 726/7 |
| 2012/0114118 | A1 | 5/2012 | Verma |
| 2012/0117183 | A1 | 5/2012 | Wong et al. |
| 2012/0173884 | A1 | 7/2012 | Patil |
| 2012/0317414 | A1 | 12/2012 | Glover |
| 2012/0331293 | A1 | 12/2012 | Ma et al. |
| 2013/0072126 | A1 | 3/2013 | Topaltzas et al. |
| 2013/0097302 | A9 | 4/2013 | Khedouri et al. |
| 2013/0145406 | A1 | 6/2013 | Baskaran et al. |
| 2013/0174222 | A1 | 7/2013 | Ogle |

FOREIGN PATENT DOCUMENTS

| | | |
|---|---|---|
| EP | 0852445 A2 | 7/1998 |
| EP | 0886409 A2 | 12/1998 |
| EP | 1134977 A1 | 9/2001 |
| EP | 1246463 A2 | 10/2002 |
| WO | 96/06504 A1 | 2/1996 |
| WO | 96/32702 A1 | 10/1996 |
| WO | 99/21364 A1 | 4/1999 |
| WO | 99/28842 A1 | 6/1999 |
| WO | 99/30499 A1 | 6/1999 |
| WO | 99/54453 A1 | 10/1999 |
| WO | 01/35571 A1 | 5/2001 |
| WO | 01/93212 A2 | 12/2001 |
| WO | 02/21761 A2 | 3/2002 |
| WO | 2004/002112 A1 | 12/2003 |

OTHER PUBLICATIONS

"Conditional access," Wikipedia, the free encyclopedia, http://en.wikipedia.org/wiki/Conditional_access, 8 pages, created Jul. 7, 2005.
"Digital rights management," Wikipedia, the free encyclopedia, last modified Mar. 30, 2012, 30 pages http://en.wikipedia.org/w/index.php?title=Digital_rights_management&printable=yes.
"Encrypted Media Extensions, W3C Editor's Draft Dec. 17, 2012," W3C, http://dvcs.w3.org/hg/html-media/raw-file/tip/encrypted-media/encrypted-media.html, 32 pages, created Feb. 22, 2012, current draft dated Dec. 17, 2012.
"Establishing Interconnectivity among Various Makers' Products through Standardization of VOD Protocol", NTT Corporation Press Release, Sep. 27, 2002 http://www.ntt.co.jp/news/news02e/0209/020927.html.
"Getting Started: Background and Basics—The Chromium Projects," http://chromium.org/nativeclient/getting-started/getting-started-background-and-basics, 4 pages, Sep. 2, 2006.
"Google Native Client," Wikipedia, the free encyclopedia, http://en.wikipedia.org/wiki/Google_Native_Client, 6 pages, created Dec. 9, 2008.
"High-bandwidth Digital Content Protection," Wikipedia, the free encyclopedia, last modified Nov. 14, 2012, 7 pages http://en.wikipedia.org/w/index.php?title=High-bandwidth_Digital_Content_Protection&printable=yes.
"HTML5," Wikipedia, the free encyclopedia, http://en.wikipedia.org/wiki/HTML5, 9 pages, created Nov. 16, 2006.

"Intelligent Systems for Finance and Business," Goonatilake, S. et al., eds., Chapters 2-10, 1995, pp. 31-173.
"Irdeto Access and Optibase create Strategic Alliance", Press Release, Irdeto Access, Dec. 14, 2000 pp. 1-4 http://www.irdetoaccess.com/press/0000041.htm.
"Irdeto Access and Optibase create Strategic Alliance", Press Release, Optibase, Dec. 14, 2000, pp. 1-2 http://www.optibase.com/html/news/December_14_2000.html.
"Media Source Extensions, W3C Editor's Draft Dec. 18, 2012," http://dvcs.w3.org/hg/html-media/raw-file/tip/media-source/media-source.html, 25 pages, created Jul. 11, 2011, current draft dated Dec. 18, 2012.
"Media Source Extensions," http://html5-mediasource-api.googlecode.com/svn/trunk/draft-spec/mediasource-draft-spec.html, 1 page, Jul. 11, 2011.
"MediaSource Extensions v0.3," editor A. Colwell, http://html5-mediasource-api.googlecode.com/syn/tags/0.3/draft-spec/mediasource-draft-spec.html, 14 pages, Mar. 13, 2012.
"Multimedia over Coax Alliance," Wikipedia, the free encyclopedia, http://en.wikipedia.org/wiki/Multimedia_over_Coax_Alliance, 4 pages, created Jun. 11, 2006.
"PlayReady," Wikipedia, the free encyclopedia, last modified Jan. 30, 2012, 2 pages http://en.wikipedia.org/w/index.php?title=PlayReady&printable=yes.
"Sandbox—The Chromium Projects," http://dev.chromium.org/developers/design-documents/sandbox, 8 pages, Sep. 2, 2008.
"Scalable Video Coding," Wikipedia, the free encyclopedia, last modified Sep. 10, 2012, 4 pages http://en.wikipedia.org/w/index.php?title=Scalable_Video_Coding&printable=yes.
"UltraViolet (system)," VVikipedia, the free encyclopedia, last modified Feb. 20, 2012, 5 pages http://en.wikipedia.org/w/index.php?title=UltraViolet_(system)&printable=yes.
"W3C HTML Working Group," http://www.w3.org/html/wg, 9 pages, May 9, 2007.
"Web Cryptography Working Group Charter," W3C Technology and Society domain, http://www.w3.org/2011/11/webcryptography-charter.html, 6 pages, Apr. 3, 2012.
"What is HDCP (high definition copy protocol)?" Digital Connection, 2005, 2 pages http://www.digitalconnection.com/FAQ/HDTV_12.asp.
Balthrop, J. et al., "Coverage and Generalization in an Artificial Immune System", Proceedings of Genetic and Evolutionary Computation Conference (GECCO), Jul. 2002, pp. 1-8.
Barth, A. et al., "The Security Architecture of the Chromium Browser," Technical Report, Stanford University, 2008.
Blumenfeld, S. M., "Streaming Media—System Security," Broadcast Engineering Magazine, Oct. 2001, pp. 1-2.
Canadian Examiner Report for Application No. 2,559,323 mailed May 6, 2008, 3 pages.
Cheng, H. C. H., "Partial Encryption for Image and Video Communication", Department of Computing Science, University of Alberta, Fall 1998, pp. 1-87.
Cheng, H. et al., "Partial Encryption of Compressed Images and Videos", IEEE Transactions on Signal Processing, vol. 48, No. 8, Aug. 2000, pp. 2439-2451.
Deitcher, D., "Secure Implementations of Content Protection (DRM) Schemes on Consumer Electronic Devices," Discretix, White Paper, May 2011, 17 pages.
Eskicioglu, A. M. et al., "An Overview of Multimedia Content Protection in Consumer Electronics Devices", SP:IC, vol. 16 No. 7, Apr. 2001, pp. 681-699.
Ferrill, E. et al., "A Survey of Digital Watermarking", Feb. 25, 1999, 15 pages http://elizabeth.ferrill.com/papers/watermarking.pdf.
Forrest, S., "Research Projects," Dec. 2, 2003, pp. 1-3 http://www.cs.unm.edu/.about.forrest/projects.html.
Glazkov, D., "What the Heck is Shadow DOM?," http://glazkov.com/2011/01/14/what-the-heck-is-shadow-dom, 14 pages, Jan. 14, 2011.
Goodman, J. et al., "Low Power Scalable Encryption for Wireless Systems", Wireless Networks, No. 4, Jan. 1998, pp. 55-70.
Griwodz, C. et al., "Protecting VoD the Easier Way", ACM Multimedia, Bristol, UK, Jan. 1998, pp. 21-28.

(56) References Cited

OTHER PUBLICATIONS

Griwodz, C., "Video Protection by Partial Content Corruption", Multimedia and Security Workshop at ACM Multimedia, Bristol, UK, Sep. 1998, pp. 1-5.
Hunter, J., et al, "A Review of Video Streaming Over the Internet", DSTC Technical Report TR97-10, Aug. 1997, pp. 1-28.
International Search Report and Written Opinion for International Patent Application No. PCT/US07/62055 mailed Sep. 11, 2007.
Kirovski, D. et al, "Digital Rights Management for Digital Cinema", Proceedings of the SPIE, Bellingham, VA, vol. 4472, Jul. 31, 2001, p. 105-120.
Metz, C., "Google Native Client: The web of the future—or the past?" The Register, http://www.theregister.co.uk/2011/09/12/google_native_client_from_all_sides/print.html, 13 pages, Sep. 12, 2011.
Office Action for European Patent Application No. 05250968.4 mailed Jan. 26, 2006.
Official Communication for Chinese Patent Application No. 2004800071571 mailed Apr. 13, 2007.
Official Communication for European Patent Application No. 04757582.4 mailed May 22, 2007.
Omneon Video Networks Product Announcement, "Broadband Streaming—Omneon and BSkyB", TB-1006-1, 1998, pp. 1-4.
Schulzrinne, H., et al., "Real Time Streaming Protocol (RTSP)," RFC 2326, Apr. 1998, pp. 1-86.
Schulzrinne, H., et al., "RTP: A Transport Protocol for Real-Time Applications", RFC 1889, Jan. 1996, pp. 1-75.
Search Report for European Patent Application No. 05250968.4 mailed Oct. 12, 2005.
Spanos, G. et al., "Performance Study of a Selective Encryption Scheme for the Security of Networked, Real-Time Video", Proceedings of the Fourth International Conference on Computer Communications and Networks, ICCCN '95, Las Vegas, NV, Sep. 1995, pp. 2-10.
Supplementary European Search Report for European Patent Application No. 00986215 dated Nov. 14, 2005.
Supplementary European Search Report for European Patent Application No. 04757582.4 mailed Nov. 20, 2006.
Teixeira, L. M. et al, "Secure Transmission of MPEG Video Sources", Proceedings of IEEE Workshop on ISPACS, Nov. 6, 1998, pp. 1-5.
Wu, T.-L. et al., "Selective Encryption and Watermarking of MPEG Video (Extended Abstract)", submitted to International Conference on Image Science, Systems, and Technology, Feb. 17, 1997, 10 pages.
Yee, B. et al,, "Native Client: A Sandbox for Portable, Untrusted x86 Native Code," IEEE Symposium on Security and Privacy, Oakland 2009, 15 pages, May 16-19, 2009.
Yoshida, K. et al., "A Continuous-Media Communication Method for Minimizing Playback Interruptions", IS&T/SPIE Conference on Visual Communications and Image Processing, San Jose, California, vol. 3653: Jan. 1999, 10 pages.
Zhang, J. et al., "A Flexible Content Protection System for Media-On-Demand", Proceedings of the Fourth International Symposium on Multimedia Software Engineering 2002, Dec. 11-13, 2007, Piscataway, NJ, Dec. 11, 2002, pp. 272-277.
Official Communication for U.S. Appl. No. 13/586,664 mailed Dec. 26, 2013.
Official Communication for U.S. Appl. No. 13/437,789 mailed Mar. 26, 2013.
Official Communication for U.S. Appl. No. 13/586,664, mailed Jun. 20, 2013.
Official Communication for U.S. Appl. No. 13/437,789 mailed Aug. 14, 2013.
Colwell, A., "Proposal for a MediaSource API that allows sending media data to a HTMLMediaElement," Jul. 11, 2011, pp. 1-11 http://lists.whatwg.org/pipermail/whatwg-whatwg.org/2011-July/032384.html.
Official Communication for U.S. Appl. No. 13/437,789 mailed Nov. 13, 2013.
Official Communication for U.S. Appl. No. 13/532,734 mailed Oct. 23, 2013.
Official Communication for U.S. Appl. No. 13/654,271 mailed. Oct. 24, 2013.
Official Communication for U.S. Appl. No. 13/654,237 mailed Oct. 23, 2013.
Official Communication for U.S. Appl. No. 13/712,764 mailed Nov. 7, 2013.

* cited by examiner

EXTENDING BROWSER FUNCTIONALITY WITH DYNAMIC ON-THE-FLY DOWNLOADING OF UNTRUSTED BROWSER COMPONENTS

CROSS-REFERENCE TO RELATED APPLICATION

This application is a utility patent application based on previously filed U.S. Provisional Patent Application Ser. No. 61/569,755 filed on Dec. 12, 2011, the benefit of which is hereby claimed under 35 U.S.C. §119(e) and which is incorporated herein by reference.

FIELD

The present embodiments relate generally to playing protected content and, more particularly, but not exclusively, to extending a browser functionality by providing for dynamic downloads of at least untrusted Digital Rights Management (DRM) modules onto a client device using a super sandbox. Downloads of other modules to extend browser functionality are also considered.

BACKGROUND

Today, there is a desire by many individuals, organizations, and businesses to protect their rights to media content that they produce from improper copying, and/or distribution. At least some of these desires arise in part because these individuals, organizations, and/or businesses are at least in part dependent upon revenue generated from their media content. Such media content may include virtually any format or form, including songs, videos, images, documents, games, books, articles, and/or other audio content, to name just a few examples of media content that some parties may wish to protect.

One class of solutions that has been implemented to attempt to address this desire is known as Digital Rights Management (DRM). Briefly, DRMs provide access control technologies used by publishers, copyright holders, and others to control their media content after it is given to a consumer, from improper access, copying, and/or distribution.

However, there are a large number of these DRM solutions available and in use by various media content distributors, media player manufacturers, and so forth. Moreover, a user of their client device often wishes to download and install components including various DRM solutions that enable the user to access the media content. While users do not wish to be restricted from accessing and playing media content, many users also seek to be protected from untrusted or possibly otherwise malicious programs, including possible untrusted DRMs, that they inadvertently download and install onto their client devices. Thus, users seek a client device that allows great flexibility, while protecting them from unsafe actions.

Different approaches to addressing these seemingly conflicting requirements include providing minimum security protection that allows the user to download and execute almost any component, in a "let the buyer beware," approach. Other approaches provide maximum security protection such that users might be unable to download or install almost anything without significant interactions, and 'hoop jumping,' by the user. These extreme positions may either leave the user at significant risk, and therefore frustrated, or simply unsatisfied and therefore also frustrated. In either instance, users often perceive their environment to be only as useful as the internet websites that it can render. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

Figure 1:
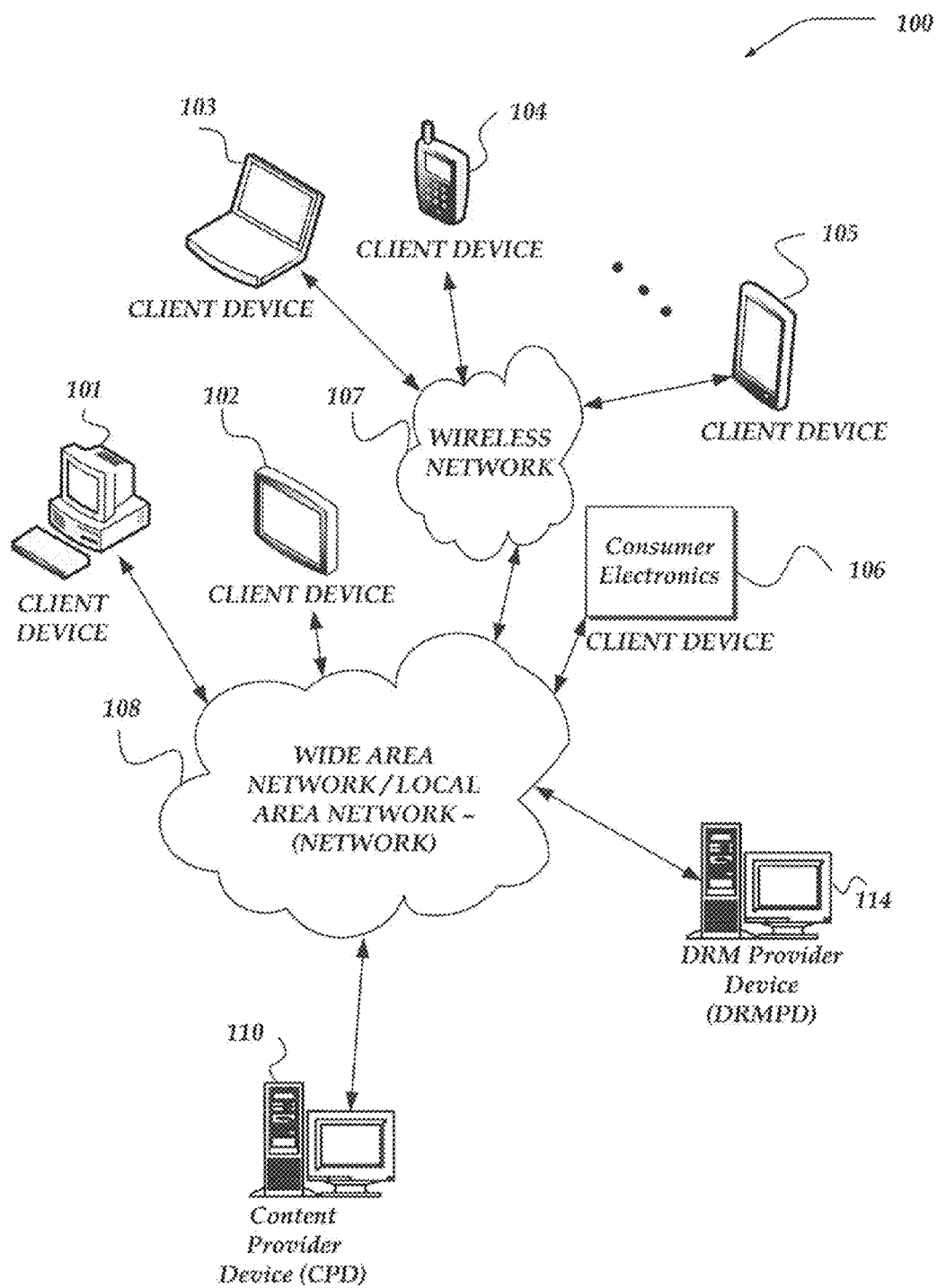
FIG. 1 illustrates a system diagram of one embodiment of an environment in which the embodiments may be practiced.

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive, and allows for being based on additional factors not described, unless the context clearly dictates otherwise. In addition, throughout the specification, the meaning of "a," "an," and "the" include plural references. The meaning of "in" includes "in" and "on."

As used here, the term "Inter-process communication (IPC)" refers to a set of computing methods for the exchange of data among applications in one or more processes. IPC methods may include, but are not limited to message passing, synchronization, shared memory, pipes, and remote procedure calls (RPC). In one embodiment, the IPC mechanisms used herein may be configured to operate securely, in manner such that data, commands, messages, or the like, may flow in first direction using the IPC, but, not the other second or reverse direction, unless it is determined to be in response to data, commands, messages, or the like, from the first direction.

As used herein, the terms "content" or "media content" to includes any digital data that may be communicated over a network to be remotely played by a computing device. Non-exhaustive examples of content include but are not limited to movies, videos, music, spoken word, pictures, illustrations, graphics, images, text, and the like. Content is often described by its format, or container, in which the content is provided. Thus, as used here, the term "container" refers to a data stream or file format which encapsulates audio and visual content. This content often consists of interleaved audio and video data in frames, or slices, with accompanying metadata such as frame timing information, audio and/or video configuration information, encoding information, compression information, and the like. Also, the container is typically arranged to enable content to be presented for playback at a remotely located network device, such as a client device. A container may also be named a "systems stream". A non-limiting and non-exhaustive list of examples of container/system streams formats are: MPEG2-TS (Moving Picture Experts Group ("MPEG") transport stream ("TS")), flash video ("FLV"), MOV (a QuickTime file format), MP4, 3GP, and ASF (Advanced Systems Form), WebM Project file format, Matroska multimedia container format, or the like. A video encoding format, such as H.264, VP8, or the like, may be encapsulated in the container. The content may be distributed as a rights managed systems stream of data over a network such as Pay per View (PPV), Video On Demand (VoD), live streaming, or the like for playback by a remote network device. In one embodiment, the content may be protected through a license that describes how, where, when, by whom, or so forth, content that is protected may be accessed, distributed, copied, or the like. Protected content may be protected using a variety of content protection mechanisms, including through one or more Digital Rights Management (DRM) policies, licenses, and encryption/decryption keys.

As used herein, encryption refers to the process of transforming digital content (referred to as plaintext) using an algorithm (called a cipher) to make it unreadable to anyone except those possessing special knowledge, usually referred to as a key. Decryption is the process of converting encrypted digital content back into its original form. As used herein, "unencrypted" digital content refers to digital content received in plaintext—or that is otherwise not encrypted, and therefore does not need to be decrypted. It should be understood such plaintext digital content, may be received, in at least one embodiment, in a compressed form, or encoded form, and still be considered as plaintext for the purposes described herein. Moreover, as discussed further below, digital content may include portions that are encrypted, and other portions that are unencrypted within a same stream of digital content. Further, different encrypted portions of the stream of digital content may be encrypted using different encryption keys, and/or employ different licenses. In one embodiment, keys useable for decrypting the differently encrypted digital content may be rotated, reused, or renegotiated.

As used herein, the term "automatically," refers to actions performed by a computing device based on one or more decisions performed by the computing device, without an input from a user to directly initiate or otherwise direct the action.

The following briefly provides a simplified summary of the subject innovations in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, subject innovations are directed towards enabling a client device to dynamically download DRM components, and/or other browser components, on-the-fly, to extend the browser functionality, where the downloading is configured to place the downloaded component(s) within a super sandbox that, among other things, disables selected operating system calls by the downloaded component, and further performs one or more heuristic analysis on code execution of the component to detect possible malicious code. In at least one embodiment, the super sandbox further restricts the component by limiting output through the super sandbox to those responses to requests sent to the component, rather that output that the component might have initiated 'on its own.' In some embodiments, a webpage is configured to include instructions to automatically and on-the-fly download and install the component, thereby minimizing user actions to directly request and/or install the component.

As used herein, the terms "component" and "downloaded component," refer to any type of software that may be downloaded or otherwise installed within the client device, including, but not limited to how the software may be packaged. Thus, plug-ins, executables, applications, as well as scripts are considered as components.

It is noted that the component that may be downloaded and sandboxed within the super sandbox may include any of a variety of components, beyond merely DRM components. For example, the components might be configured to render decrypted content to an output device, such as a screen, or sound system. In one embodiment, the component could be a media player. In still other embodiments, the component is configured to include different Compression/decompression modules (CODECs), components configured to merely support decryption of content, components configured to de-multiplex (demux) and/or decode content, or the like. The components may also extend the functionality of the browser by providing graphical capability, fonts, or by adding virtually any other functionality that might be useable within or by a browser. Thus, the type and/or functionality of the components considered within the subject innovations are not limited. Moreover, the components could be implemented using any of a variety of scripting languages, programming languages, or the like. In addition, the component might be otherwise trusted, and still be placed within the super sandbox, for consistency. Thus, the subject innovations disclosed herein are not limited to particular components, implementation, or the like.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 108, wireless network 107, client devices 101-106, Content Provider Device ("CPD") 110, and Digital Rights Management (DRM) Provider Device (DRMPD) 114.

One embodiment of client devices 101-106 is described in more detail below in conjunction with FIG. 2. In one embodiment, at least some of client devices 101-106 may operate over a wired and/or a wireless network such networks 107 and 108. As shown, client device 101 may include virtually any computing device capable of communicating over a network to send and receive information, including instant messages, performing various online activities, or the like. The set of such devices may include devices that typically connect using a wired or wireless communications medium such as personal computers, multiprocessor systems, microprocessor-based or programmable consumer electronics, network PCs, or the like. Also, client device 102 may include virtually any device usable as a video display device, such as a television, display monitor, display screen, projected screen, and the like. Additionally, client device 106 may include any kind of Consumer Electronic device, e.g., a Blu-ray player, DVD player, CD player, portable music playing device, portable display projector, and the like. Moreover, client devices 101-106 may provide access to various computing applications, including a browser, or other web-based application.

Generally, however, client devices 101-106 may include virtually any portable computing device capable of receiving and sending messages over a network, accessing and/or playing content, such as network 108, wireless network 107, or the like. Further, client devices 103-105 may include virtually any portable computing device capable of connecting to another computing device and receiving information such as, laptop computer 103, smart phone 104, and tablet computers 105, and the like. However, portable computer devices are not so limited and may also include other portable devices such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, devices 101-106 typically range widely in terms of capabilities and features.

A web-enabled client device may include a browser application that is configured to receive and to send web pages, web-based messages, and the like. The browser application may be configured to receive and display graphics, text, multimedia, media content, and the like, employing virtually any Internet based and/or network-based, protocol, including but not limited to a wireless application protocol messages ("WAP"), Hypertext Transfer Protocol ("HTTP"), or the like. In one embodiment, the browser application is enabled to employ Handheld Device Markup Language ("HDML"), Wireless Markup Language ("WML"), WMLScript, JavaScript, or other scripting language, Standard Generalized Markup Language ("SGML"), HyperText Markup Language ("HTML"), eXtensible Markup Language ("XML"), and the like, to display and send a message. In one embodiment, a user of a client device may employ the browser application to perform various activities over a network (online). However, another application may also be used to perform various online activities.

As described further below, the browser application may enable a user to access a website, over the network (e.g., networks 107 and/or 108), such as might be provided through CPD 110. In some embodiments, CPD 110 may include within a webpaae accessed by client device 101-106, one or more scripts, links, and/or other instructions that direct the client device to on-the-fly download for installation one or more components usable to access content from CPD 110, or the like. In one embodiment, the instructions might further direct the client device to access the component, such as a DRM module, or the like, from DRMPD 114. However, in other embodiments, the downloaded component may be accessed through CPD 110, another client device, or any of a variety of other sources.

Client devices 101-106 also may include at least one other client application that is configured to receive and/or send content between another computing device. The client application may include a capability to send and/or receive content, or the like. The client application may further provide information that identifies itself, including a type, capability, name, and the like. In one embodiment, client devices 101-106 may identify themselves as part of a class of devices. In another embodiment, client devices 101-106 may uniquely identify themselves through any of a variety of mechanisms, including a phone number, Mobile Identification Number ("MIN"), an electronic serial number ("ESN"), Internet Protocol (IP) Address, network address, or other mobile device identifier. The information may also indicate a content format that the mobile device is enabled to employ. Such information may be provided in a network packet, or the like, sent between other client devices, CPD 110, or other computing devices. Moreover, it should be readily understood that devices and/or components within a device that is communicating with a client device may also identify themselves using any of a variety of mechanisms, including those used by the client device.

Client devices 101-106 may further be configured to include a client application that enables an end-user to log into an end-user account that may be managed by another computing device, such as CPD 110, or the like. Such end-user account, in one non-limiting example, may be configured to enable the end-user to manage one or more online activities, including in one non-limiting example, search activities, social networking activities, browse various websites, communicate with other users, or the like. In one embodiment, the end-user's client device may receive content streamed to the client device for play at the client device. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 101-106. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) generation radio access for cellular systems, WLAN, Wireless Router ("WR") mesh, and the like. Access technologies such as 2G, 3G, 4G and future access networks may enable wide area coverage for mobile devices, such as client devices 101-106 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), Wideband Code Division Multiple Access ("WCDMA"), and the like. In essence, wireless network 107 may include virtually any wireless communication mechanism by which information may travel between client devices 103-106 and another computing device, network, and the like.

Network 108 is configured to couple network devices with other computing devices, including, CPD 110, and through wireless network 107 to client devices 103-105. Network 108 is enabled to employ any form of network mechanism for communicating information from one electronic device to another. Also, network 108 can include the Internet in addition to LANs, WANs, direct connections, such as through a universal serial bus ("USB") port, other forms of network mechanism, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, network mechanisms by way of example, network mechanisms include wired media such as twisted pair, coaxial cable, fiber optics, wave guides, and other wired media and wireless media such as acoustic, RF, infrared, and other wireless media.

One embodiment of CPD 110 is described in more detail below in conjunction with FIG. 3. Briefly, however, CPD 110 includes virtually any network device usable to operate as a content server to connect to network 108 to provide content to client devices 101-106. In some embodiments, CPD 110 may provide protected content to a client device. In one embodiment, at least some portions of the content may be encrypted, while at least some other portions of the content may be unencrypted.

CPD 110 may also provide to a client device a downloadable component usable to enable the cheat device to access and/or play content. In some embodiments, CPD 110 may include within a webpage accessed by the client device, a set of HyperText Markup Language instructions, a script, an applet, an application, or the like, configured to instruct the client device to on-the-fly automatically (without additional user interactions) download the component onto the client device. In some embodiments, the component might be obtained from CPD 110; however, the component might also be obtained from another network device, such as DRMPD 114, another client device, or yet another network device (not shown).

In some embodiments, the downloaded component is a DRM module usable to manage digital rights within the client device. In some embodiments, the downloaded component might be a CODEC, a decryption module, a key management module, or any of a variety of components useable to enable the client device to access and/or play content. However, subject innovations described herein may also be employed to enable downloading of components for uses other than with content management. Thus, the subject innovations are not to be construed as being limited to content management components.

It should be readily recognized that CPD 110 is configured to operate on behalf of a content owner, distributor, or similar business entity. However, while used herein to represent such network devices useable to provide content, it is further recognized that other devices may also be employed. For example, a content provider may employ a Content Distribution Network Device (not shown) that operates on behalf of the content provider to provide content. Thus, other configurations and variations of devices serving content are also envisaged, and other embodiments are not constrained to a single configuration/arrangement of devices.

Devices that may operate as CPD 110 include various network devices, including, but not limited to personal computers, desktop computers, multiprocessor systems, microprocessor-based or programmable consumer electronics, network PCs, server devices, network appliances, and the like.

Although FIG. 1 illustrates CPD 110 as a single computing device, the invention is not so limited. For example, one or more functions of CPD 110 may be distributed across one or more distinct network devices. Moreover, CPD 110 is not limited to a particular configuration. Thus, in one embodiment, CPD 110 may contain a plurality of network devices to provide content, licenses, and/or decryption keys to a client device, such as client devices 101-106. Similarly, in another embodiment, CPD 110 may contain a plurality of network devices that operate using a master/slave approach, where one of the plurality of network devices of CPD 110 operates to manage and/or otherwise coordinate operations of the other network devices. In other embodiments, the CPD 110 may operate as a plurality of network devices within a cluster architecture, a peer-to-peer architecture, and/or even within a cloud architecture. Thus, the invention is not to be construed as being limited to a single environment, and other configurations, and architectures are also envisaged.

In one embodiment, CPD 110 may also be configured to manage license requests, and/or access to decryption keys useable to decrypt portions of the encrypted digital content by a client device for play based on the license.

It should be noted that the encrypted content may be encrypted using any of a variety of symmetric and/or asymmetric key technologies. For example, possible asymmetric keys technologies include, but are not limited to, Diffie-Hellman, RSA, Merkle-Hellman, PGP, X.509, elliptic curve techniques, ElGamal, or the like. Similarly, various possible symmetric key technologies include, but are not limited to, Twofish, Serpent, Advanced Encryption Standard (AES), Blowfish, CAST5, RC4, 3DES, and IDEA, to name just a few. Moreover, the content may be protected using a combination of symmetric and asymmetric key technologies. For example, a symmetric content decryption key might be used to encrypt/decrypt the content, and an asymmetric key technology might be used to encrypt/decrypt the content decryption key.

DRMPD 114 represents one of a variety of network devices for managing access to symmetric and/or asymmetric keys. In one embodiment, DRMPD 114 may operate to certify an ownership of a public key named within a digital certificate that provides a public key, where the public key is part of a public/private key associated with any of a variety of asymmetric key technologies. This allows others, such as CPD 110, or the like, to rely upon signatures or assertions made by the owner that corresponds to the public key that is certified. In one embodiment, DRMPD 114 may then operate as a trusted third party. Thus, in one embodiment, DRMPD 114 may operate as a Certification Authority, such as employed by many public key infrastructures (PKI) schemes. Further, DRMPD 114 may also provide Certificate Revocation Lists (CRLs) indicating when a public key/certificate is no longer valid, and might no longer be trusted/trustable.

In one embodiment, DRMPD 114 may receive a public key from a content provider, or the like, and based on various criteria, elect to make accessible the public key through a certificate that DRMPD 114 digitally signs. In one embodiment, access to the public key may enable an authorized client device to decrypt a content key that may then be used to decrypt at least a portion of the encrypted content.

In one embodiment, DRMPD 114 or CPD 110 might operate to negotiate a license and/or access to a key with client devices 101-106. In one embodiment, different content decryption keys might be used to encrypt different portions of a provided content. Thus, in one embodiment, multiple key negotiations may be performed for a given at least one content stream.

However, DRMPD 114 may also be configured to provide for download and/or installation into a client device various DRM modules usable to perform digital rights management on behalf of the client device. Thus, in some embodiments, DRMPD 114 might provide a content decryption module, a key decryption module, a CODEC usable for decompressing/decoding protected content, and/or any of a variety of other modules usable in enabling a client device to access and/or play protected content.

It should be understood, that while DRMPD 114 is illustrated as a separate device from CPD 110, in other embodiments, the functions of these devices may be integrated.

Although FIG. 1 illustrates DRMPD 114 as single computing devices, the invention is not so limited. For example, one or more functions of DRMPD 114 may be distributed across one or more distinct network devices. Moreover, DRMPD 114 is not limited to a particular configuration. Thus, in one embodiment, DRMPD 114 may contain a plurality of network devices. Similarly, in another embodiment, DRMPD 114 may contain a plurality of network devices that operate using a master/slave approach where one of the plurality of network devices operates to manage and/or otherwise coordinate operations of the other network devices. In other embodiments, the DRMPD 114 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
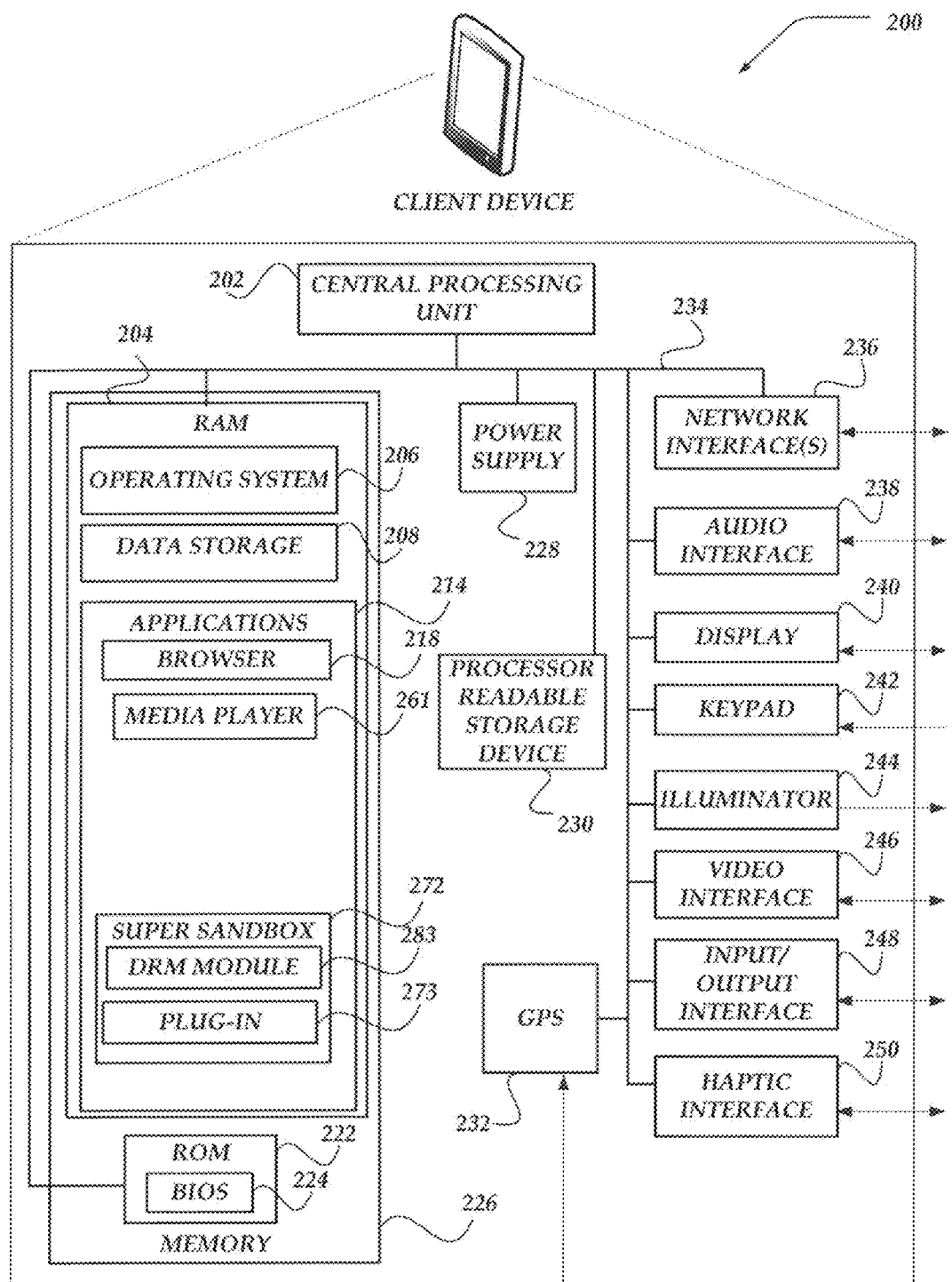
FIG. 2 illustrates one possible embodiment of a client device usable within the environment of FIG. 1.

FIG. 2 shows one embodiment of client device 200 that may be included in a system implementing the invention. Client device 200 may represent any of a variety of platforms useable to perform actions as disclosed within. Client device 200 may include many more or less components than those shown in FIG. 2. However, the components shown are sufficient to disclose an illustrative embodiment for practicing the present invention. Client device 200 may represent, for example, one embodiment of at least one of client devices 101-106 of FIG. 1.

As shown in the figure, client device 200 includes a central processing unit ("CPU") 202 in communication with a mass memory 226 via a bus 234. Client device 200 also includes a power supply 228, one or more network interfaces 236, an audio interface 238, a display 240, a keypad 242, an illuminator 244, a video interface 246, an input/output interface 248, a haptic interface 250, and a global positioning systems ("GPS") receiver 232.

Power supply 228 provides power to client device 200. A rechargeable or non-rechargeable battery may be used to provide power,. The power may also be provided by an external power source, such as an alternating current ("AC") adapter or a powered docking cradle that supplements and/or recharges a battery.

Client device 200 may optionally communicate with a base station (not shown), or directly with another computing device. Network interface 236 includes circuitry for coupling client device 200 to one or more networks, and is constructed for use with one or more communication protocols and technologies including, but not limited to, GSM, code division multiple access ("CDMA"), time division multiple access ("TDMA"), user datagram protocol ("UDP"), transmission control protocol/Internet protocol ("TCP/IP"), Short Message Service ("SMS"), GPRS, WAP, ultra wide band ("UWB"), Institute of Electrical and Electronics Engineers ("IEEE") 802.16 Worldwide interoperability for Microwave Access ("WiMax"), session initiated protocol/real-time transport protocol ("SIP/RTP"), or any of a variety of other wired and/or wireless communication protocols. Network interface 236 is sometimes known as a transceiver, transceiving device, or network interface card ("NIC").

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be an LCD, gas plasma, light emitting diode ("LED"), or any other type of display used with a computing device. Display 240 may also include as touch sensitive screen arranged to receive input from an object such as a stylus or a digit from a human hand.

Moreover, display 240 may be configured to employ any of a variety of network connection types, including, but not limited to High-Bandwidth Digital Content Protection (HDCP) connection types, Display Port (DP), Digital Visual Interface (DVI), and High-Definition Multimedia Interface (HDMI), as well as Gigabit Video Interface (GVIF), Standard-definition (SD), Unified Display Interface (UDI), or Intel Wireless Display (WiDi). At least some of these network connection types provide a form of digital copy protection. A detection of whether display 240 is connected through one of these, or other types, of network connection types may be determined using a variety of techniques, including signature transmissions, protocol handshakes, authentication procedures, or the like.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor ("CMOS") integrated circuit, charge-coupled device ("CCD"), or any other integrated circuit for sensing light.

Client device 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like. Haptic interface 250 is arranged to provide tactile feedback to a user of the client device. For example, the haptic interface 250 may be employed to vibrate client device 200 in a particular way when another user of a computing device is calling.

GPS transceiver 232 can determine the physical coordinates of client device 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS ("AGPS"), Enhanced Observed Time Difference ("E-OTD"), Cell Identifier ("CI"), Service Area Identifier ("SAI"), Enhanced Timing Advance ("ETA"), Base Station Subsystem ("BSS"), or the like, to further determine the physical location of client device 200 on the surface of the Earth. It is understood that under different conditions, GPS transceiver 232 can determine a physical location within millimeters for client device 200; and in other cases, the determined physical location may be less precise, such as within a meter or significantly greater distances. In one embodiment, however, mobile device 200 may through other components, provide other information that may be employed to determine a physical location of the device, including for example, a Media Access Control ("MAC") address, IP address, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs. However, the operating system may also provide interfaces to any of a variety of other scripting language programs as well, and are therefore not constrained to Java.

Mass memory 226 further includes, one or more data storage 208, which can be utilized by client device 200 to store, among other things, applications 214, protected content, and/or or other data. For example, data storage 208 may also be employed to store information that describes various capabilities of client device 200. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, downloaded components, or any of a variety of other content. At least a portion of the information may also be stored on another component of client device 200, including, but not limited to a disk drive, non-transitory processor-readable storage device 230 within client device 200, or even on a physical storage device accessible by client device 200 through network interfaces 236, or the like.

In some embodiments, data storage 208 may act as a buffer for content received from CPD 110 of FIG. 1. As noted above, it is recognized that providing of such content may also be performed by another device on behalf of CPD 110 of FIG. 1. Additionally, data storage 208 might further operate as a buffer for downloaded components, at least until they are installed for execution within client device 200.

Applications 214 may include computer executable instructions which, when executed by client device 200, transmit, receive, and/or otherwise process messages (e.g., SMS, Multimedia Message Service ("MMS"), instant messages ("IM"), email, and/or other messages), audio, video, and enable telecommunication with another user of another client device. Other examples of application programs include calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218, media player 261, Digital Rights Management (DRM) module 283, and one or more super sandboxes 272. Super sandbox 272 may be configured to include one or more downloaded components, such as DRM module 283 and/or plug-in 273. It should be understood that super sandboxes 272 may be part of another application.

Browser 218 may include virtually any application configured to receive and display graphics, text, multimedia, and the like, employing virtually any web based protocol. In one embodiment, the browser application is enabled to employ HDML, WML, WMLScript, JavaScript, other scripting languages, SGML, HTML, XML, and the like, to display and send a message. However, any of a variety of other web-based programming languages may be employed. In one embodiment, browser 218 may enable a user of client device 200 to provide and/or receive content from another computing device, such as CPD 110 of FIG. 1. Although browser 218 is described herein, it should be noted that there are a plurality of other applications that may operate as a user agent configured to request and/or access content over a network. Thus, other user agents way also be included within client device 200. Moreover, while a single browser is illustrated, it should be noted that client device 200 may include a plurality of browsers or applications providing functionality of a browser application.

Media player 261 represents any of a variety of software and/or hardware configurations arranged to receive and play various content. As such, in one embodiment, media player 261 may also represent a hardware component that might be installed within client device 200 and/or coupled electrically to client device 200 to enable client device 200 to access and play content. In one embodiment, media player 261 may receive protected content from browser 218, and employ one or more of CODECs, and/or DRM module 283 to enable play of the received protected content. In some embodiments, plug-in 273 may be further configured to operate with media player 261 and/or browser 218 to extend the functionality of media player 261 and/or browser 218, and/or DRM module 283.

While a single media player 261 is illustrated, it should be understood that client device 200 may include a plurality of media players, each which may be configured to employ a different CODEC(s), and/or a different DRM module(s), as well as to accept different container format(s) for the received protected content.

DRM module 283 represents any of a class of access control technologies that are configured to manage the digital access rights to protected content. In one embodiment, DRM module 283 may include a content decryption module (CDM) that is configured to receive one or more decryption keys and/or licenses, and to employ the decryption keys/licenses to decrypt at least a portion of the content and enable access to the content. In one embodiment, DRM module 283 might be configured to receive information indicating that content is protected with keys/licenses. DRM module 283 may then send a communications requesting the keys/licenses. In one embodiment, DRM module 283 might be configured to provide a communications towards a Key Management Device, such as DRMPD 114 of FIG. 1 to obtain the keys/licenses. DRM module 283 may then receive portions of the protected content from media player 261, browser 218, or another application. DRM module 283 may then employ the keys/licenses to decrypt the encrypted content and enable selected rights of use of the content. DRM module 283 may provide the decrypted content to media player 261, to output hardware, and/or to CODECS 281-283 to decode/decompress the decrypted content such that it may then be played by media player 261.

However, as illustrated, DRM module 283 and plug-in 273 are configured to operate within super sandbox 272. Thus, actions performed by either of these components are architecturally isolated by super sandbox 272. That is, super sandbox 272 provides a privileged separation between the modules isolated within it, and other modules, components, or the like, external to the super sandbox 272 as well as separation of multiple modules within sandbox 272. In some embodiments, super sandbox 272 isolates communications with the components within it and other components by preventing the isolated components (e.g., DRM module 283 and plug-in 273) from reading and/or writing to any but specified file systems, memory locations, address spaces, or even physical devices, other than those specifically identified by super sandbox 272. However, super sandbox 272 is configured to do more than merely limit where and what can be accessed by the isolated components. For example, super sandbox 272 may further constrain outputs through super sandbox 272 to be communications that are in direct response to a request for a communications from a trusted component, such as browser 218, media player 261, operating system 206, or the like. Thus, should an isolated component within super sandbox 272 "sua sponte" seek to communicate with a component outside of super sandbox 272, super sandbox 272 immediately prevents such communications to be sent outside of the super sandbox. Further, super sandbox 272 may go behind such limitations on communications, and pro-actively perform any of a variety of analysis on the sandboxed components to ensure that any response communications are unable to modify or otherwise access locations that are not so protected. Thus, even response communications allowed through super sandbox 272 remain constrained from modifying or otherwise accessing certain locations, addresses, devices, or the like. Super sandbox 272 may also analyze the responses to ensure that the response is a reasonable response to a request. Thus, for example, where the response attempts to perform some action that is not determined to be acceptable, super sandbox 272 may also inhibit such responses from flowing outside of the super sandbox. It should be noted that in some embodiments, super sandbox 272 may include and/or other perform more or less actions than disclosed herein.

Super sandbox 272 may also perform various heuristics on the isolated components to determine whether the components may be a security risk. In some embodiments, super sandbox 272 may also perform fingerprinting analysis on the isolated components. When, super sandbox 272 determines that the isolated component is a security risk, super sandbox 272 may take any of a variety of actions, including, but not limited to deleting the isolated component from client device 200, sending a warning message, further isolating communications with and/or from the component, or the like. When the component is deleted, it may also be un-registered.

In some embodiments, super sandbox 272 may employ a protected inter process communications (IPC) to enable communications between the isolated components and one or more non-isolated components. Further, super sandbox 272 might analyze the communications being sent to the component to determine whether the communications to the component within super sandbox 272 might present a risk to client computer 200, for example, by the communications requesting the isolated component to perform an unacceptable, untrustable action. When such input is received, super sandbox 272 might select to prevent these communications as well. Thus, unlike configurations that might merely minimize where a sandboxed component might read from and/or write to, super sandbox 272 performs a variety of additional actions. Thus, as disclosed herein, the sandboxed component's actions may be limited to responding to requests and/or other actions from the browser by the super sandbox 272, rather than, for example, requests from a webpage, script, or the like that may not be trusted.

Thus, super sandbox 272 is configured to allow execution of the isolated components in a manner that separates the component and its communications from other components within the client device, such that the isolated components may perform actions without polluting or otherwise possibly corrupting the other components on the client device, including such as memory locations, devices, operating systems, or the like. Super sandboxing of the isolated components then allows the isolated components to perform without making persistent changes to components within the client device, and without accessing information deemed confidential or otherwise to be protected from the isolated components. The isolated component may be allowed to run but cannot make changes to the client device, and no matter what it does, it does not have access to other components within the client device. In some embodiments, even communications to other network devices by the isolated components may be restricted or otherwise denied. As noted, the isolated components might not be able to send commands that are not authorized, outside of the super sandbox. Communications with the isolated components might be directed to occur through strict interfaces, such as secure inter process communication interfaces, or the like.

In some embodiments, the component may be a super sandboxed browser plug-in, and/or otherwise implemented as a Pepper/Pepper Plug-in Application Programming Interface (API) or PPAPI plug-in, Native Client plug-in, or Portable Native Client plug-in. However, the components may also be other types of plug-ins, including scripts, .exe files, .dll files, or the like. Thus, the types of components that may be downloaded, and/or sandboxed are not constrained to a particular type, or form, or function. Moreover, the components may be otherwise considered to be trusted or trustable, or un-trustable.

Illustrative Network Device

Figure 3:
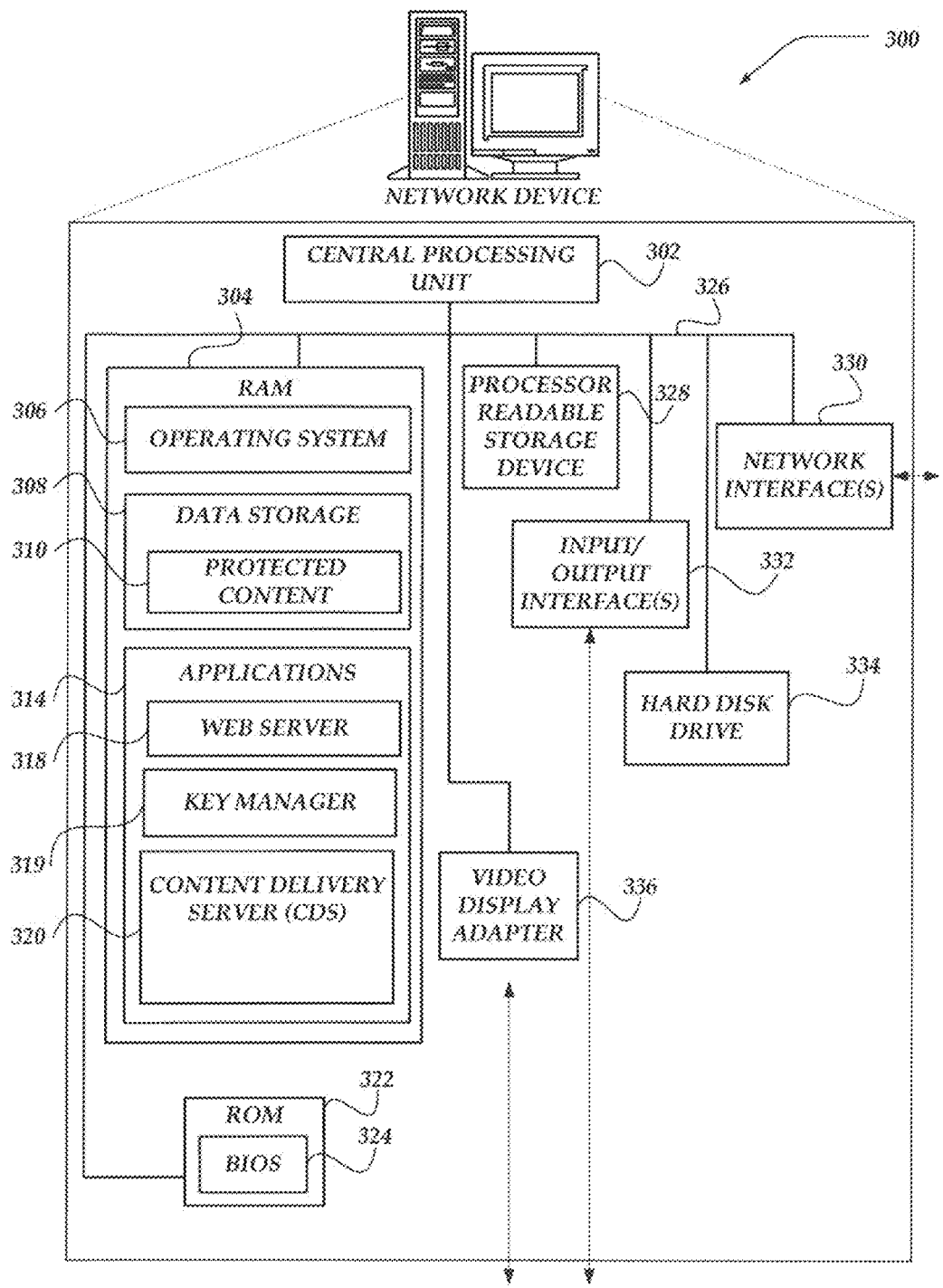
FIG. 3 illustrates one possible embodiment of a network device usable by a content provider within the environment of FIG. 1.

FIG. 3 shows one embodiment of a network device 300, according to one embodiment of the invention. Network device 300 may include many more or less components than those shown. The components shown, however, are sufficient to disclose an illustrative embodiment for practicing the subject innovations. Network device 300 may be configured to operate as a server, a client, a peer, a host, or any other device. Network device 300 may represent, for example CPD 110 of FIG. 1. Further, network device 300 might be further configured to perform at least some of the actions of DRMPD 114 of FIG. 1, as well.

Network device 300 includes central processing unit 302, computer readable storage device 328, network interface unit 330, an input/output interface 332, hard disk drive 334, video display adapter 336, and a mass memory, all in communication with each other via bus 326. The mass memory generally includes RAM 304, ROM 322 and one or more permanent (non-transitory) mass storage devices, such as hard disk drive 334, tape drive, optical drive, and/or floppy disk drive. The mass memory stores operating system 306 for controlling the operation of network device 300. Any general-purpose operating system may be employed. BIOS 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage media. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electrically Erasable Programmable Read-only Memory ("EEPROM"), flash memory or other memory technology, Compact Disc Read-only Memory ("CD-ROM"), digital versatile disks ("DVD") or other optical storage, magnetic cassettes, magnetic tape, magnetic disk storage or other magnetic storage devices, or any other physical media which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses, or the like. Data storage 308 may further include program code, data, algorithms, and the like, for use by a processor, such as central processing unit 302 to execute and perform actions. In one embodiment, at least some of data storage 308 might also be stored on another component of network device 300, including, but not limited to non-transitory (processor) computer readable storage device 328, hard disk drive 334, or the like.

Data storage 308 may further store protected content 310. Protected content 310 represents any of a variety of content that may be protected from access using a license, encryption, and/or the like. In some embodiments, protected content 310 may include a plurality of available versions of content. In one embodiment, the available versions may include one or more video tracks and/or one or more one or more audio tracks.

Data storage 308 may also be configured to store downloadable components, including, but not limited to DRM modules, CODECs, decryption modules, and any of a variety of other plug-in, components, or the like, usable to extend and/or otherwise update functionality of a browser, media player, or the like.

The mass memory also stores program code and data. One or more applications 314 are loaded into mass memory and run on operating system 306. Examples of application programs may include transcoders, schedulers, calendars, database programs, word processing programs, Hypertext Transfer Protocol ("HTTP") programs, customizable user interface programs, IPSec applications, encryption programs, security programs, SMS message servers, IM message servers, email servers, account managers, and so forth. Web server 318, key manager 319, and content delivery server 320, may also be included as application programs within applications 314.

Web server 318 represent any of a variety of services that are configured to provide content, including messages, over a network to another computing device. Thus, web server 318 includes, for example, a web server, an FTP server, a database server, a content server, or the like. Web server 318 may provide the content including messages over the network using any of a variety of formats including, but not limited to WAP, HDML, WML, SGML, HTML, XML, Compact HTML ("cHTML"), Extensible HTML ("xHTML"), or the like. Web Server 318 may also be configured to enable a user of a client device, such as client devices 101-106 of FIG. 1, to browse content, such as streams of protected content 310, and select content for display/play on the client device. Further, web server 318 may be configured to provide for installation and/or execution at a client device, a downloadable component, such as discussed above in conjunction with FIG. 2.

Key manager 319 is configured to manage negotiations of decryption keys and/or licenses for content streams. In one embodiment, key manager 319 may provide decryption keys and/or licenses to DRMPD 114 of FIG. 1. In other embodiments, key manager 319 may perform negotiations directly with a client device. In one embodiment, key manager 319 may select one or more content decryption keys for use in encrypting different portions of a content stream.

Key manager 319 may also be configured to revoke a license, and/or invalidate one or more decryption keys, based, for example, on an unauthorized request for a license, key, or even based on receiving an indication that an integrity of a requesting client device is determined to be compromised.

Content Delivery Server (CDS) 320 is configured to manage access to protected content 310. In one embodiment, the content may be protected through a license or licenses. In another embodiment, the content may be protected by being encrypted. In one embodiment, one portion of content may be encrypted using a first content encryption key; while another portion of the content may be encrypted using a second content encryption key. Thus, to decrypt the protected content, a user's client device may need access to a license that indicates how, where, and/or when the protected content may be accessed. The user's client device may also need access to one or more decryption keys usable to decrypt various portions of the protected content. In one embodiment, where multiple encryption keys are used to encrypt the content, a key rotation scheme may be employed, where the client device is provided an indication that the content is encrypted using a different key, and that the client device will have to use the different key. However, in another embodiment, the content may be protected by a license(s) and not be encrypted using encryption key(s).

Example Super Sandbox Architecture

Figure 4:
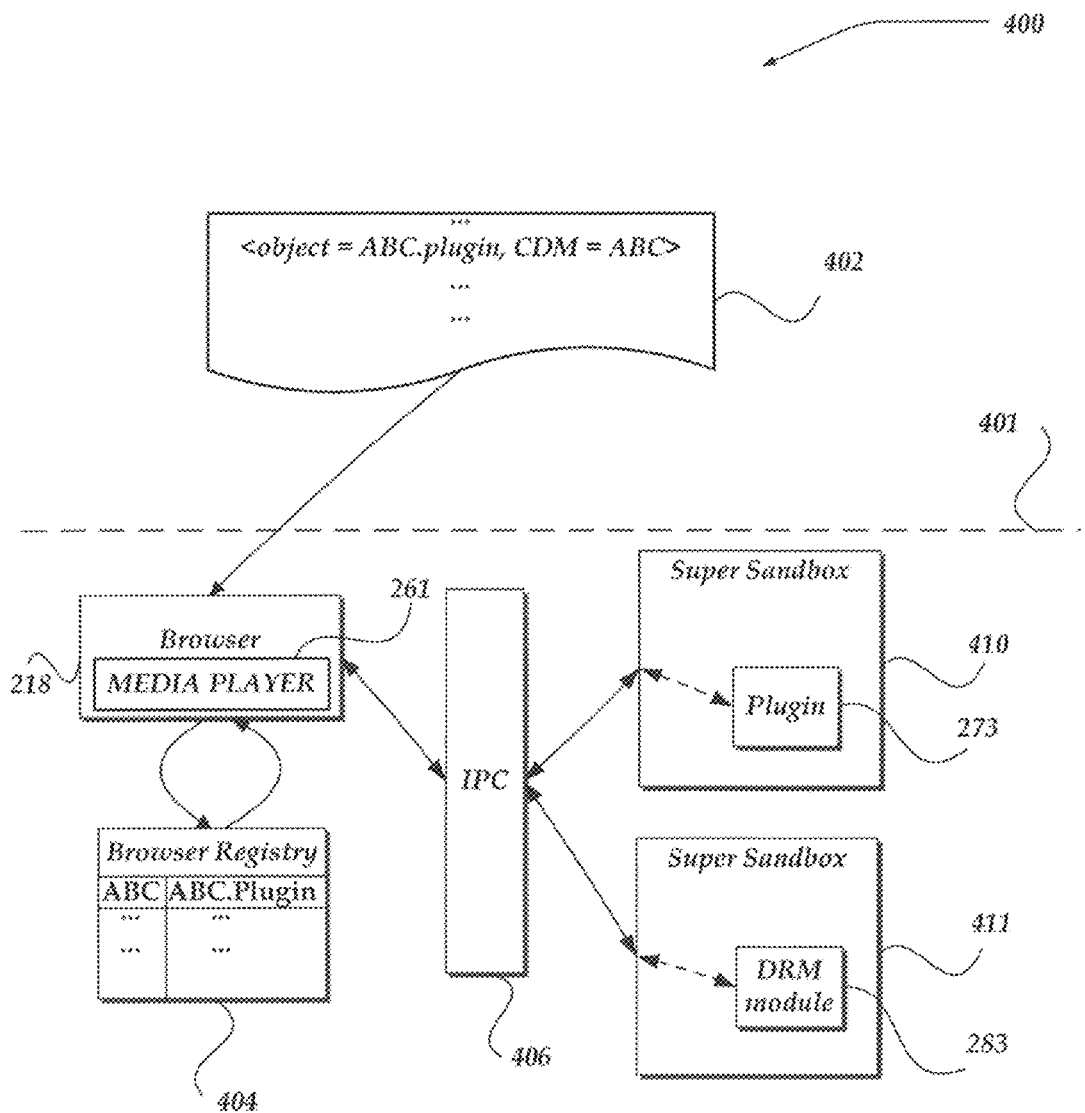
FIG. 4 illustrates one possible embodiment of a security architecture usable to manage un-trusted DRM modules downloaded onto a client device.

FIG. 4 illustrates one possible embodiment of a security architecture usable to manage un-trusted DRM modules, plug-in, and/or other components, downloaded onto a client device. Architecture 400 may include many more or less components than those shown. The components shown, however, are sufficient to disclose an illustrative embodiment for practicing the subject innovations.

It should be noted that while architecture 400 may be configured to manage un-trusted components, the subject innovations are not so constrained. Thus, in some embodiments, the components that are managed within a super sandbox as described herein might be otherwise considered as trusted or trustable. In this manner, a consistent policy might be implemented for any component downloaded within a client device for installation and/or execution.

As shown in FIG. 4, architecture 400 is divided into two portions, a first portion above line 401, and considered to be external to the lower portion, which is below line 401. Elements below line 401 are considered to reside within a client device, such as client device 200 of FIG. 2, or the like. Elements above line 401 may be considered to reside outside of a client device, such as client device 200.

As shown, above line 401 is webpage 402, while below the line 401 are browser 218, browser registry 404, IPC 406, super sandboxes 410-411. Within browser 218 is media player 261. In this configuration, media player 261 may operate as a component within browser 218, including as a plug-in to browser 218.

Within super sandbox 410 is plug-in 273, while DRM module 283 is illustrated within a separate super sandbox 411. Browser 218 is the same as illustrated in FIG. 2, while super sandboxes 410-411 represent instances of super sandbox 272 of FIG. 2. Moreover, DRM module 283 and plug-in 273, while the same as illustrated in FIG. 2, are intended to represent non-limiting, non-exhaustive examples of downloadable components that may be sandboxed within a super sandbox. Virtually any component may be super sandboxed, including decryption components, content protection components, license exchange components, demux components, decoding components, graphical components, or virtually any other component usable to extend and/or otherwise upgrade a functionality of browser 218 and/or a media player 261.

Webpage 402 may represent a webpage accessible from a network device, such as CPD 110 of FIG. 1, or the like. Web page 402 may include, a link, script, or the like, useable to instruct a client device to automatically download and install for execution a component. That is, when a client device is directed to a network device, such as CPD 110 of FIG, 1, the client device's browser, such as browser 218 of FIG. 2, accesses and 'reads' a webpage, such as webpage 402. When, the link, script, or the like, is reached within the webpage 402, browser 218 may interpret the instructions and as result, request download of the indicated component.

Additionally, browser 218 may register the component into a registry, such as browser registry 404. In one embodiment, updates to browser registry 404 may indicate that the downloaded component is accessible through a super sandbox, such as super sandboxes 410-411. Thus, communications with plug-in 273 and/or DRM module 283 are performed through IPC 406 and one or more of super sandboxes 410-411.

As discussed above, super sandboxes 410-411 may perform a variety of security actions, to limit access by the isolated components, such as plug-in 273 and/or DRM module 283.

Thus, for example, when protected content is accessed by browser 218, browser 218 and/or media player 261 may examine the browser registry to locate the component, such as the DRM module 283, that extends the functionality. When located within browser registry 404, browser 218 and/or media player 261 may then employ DRM module 283, and/or plug-in 273 to request at least one of a decryption key or license to enable access of the protected content for play by media player 261. DRM module 283 might be instructed to generate a key request that is sent through super sandbox 411, through IPC 406 and to browser 261 (or another un-shown application). Browser 261, or another application, may then proxy the request to another network device to obtain the license and/or decryption key. The key and/or license may then be forwarded through IPC 406 and super sandbox 411 to DRM module 283. Additionally, at least some encrypted content may also be provided through IPC 406 and super sandbox 411 to DRM module 283 to be decrypted and returned for play. At any instance that super sandbox 411 determines that communications through IPC 406 and/or into/out of super sandbox 411 are un-trustable, super sandbox 411 may inhibit the communications, inhibit additional actions by DRM module 283, and/or perform any of a variety of other actions. Additionally, prior allowing DRM module 283 to respond to outside (of the sandbox) requests, super sandbox 411 may perform one or more analytics upon the isolated DRM module 283 to determine whether or not the component is trustable. Based on results of the analysis, super sandbox 411 may further restrict communications with the isolated component, send out a warning message, and/or even delete the un-trusted component.

It should be noted that super sandboxes 410-411 may be generated in response to request to download a component, or be pre-generated on a client device. Thus, in some embodiments, a super sandbox may not contain a component, and might reside idle, until a request to download a component is initiated on the client device. Any of a variety of mechanisms may be used to trigger a super sandbox or the instantiation of a component within it, including based on a command from browser 218, an operating instruction, another application (not shown), or even based on a script or the like, within webpage 402.

As illustrated, in some embodiments, a distinct, super sandbox might be used to isolate a given component, such that each downloaded component (and/or interrelated components) is separately sandboxed. FIG. 4 illustrates such an example. However, in other embodiments, downloaded components might be combined and isolated by a single super sandbox. Thus, in FIG. 4, for example, plug-in 273 and DRM module 283 might be isolated within a same super sandbox, such as both within super sandbox 410 or 411.

General Operation

Figure 5:
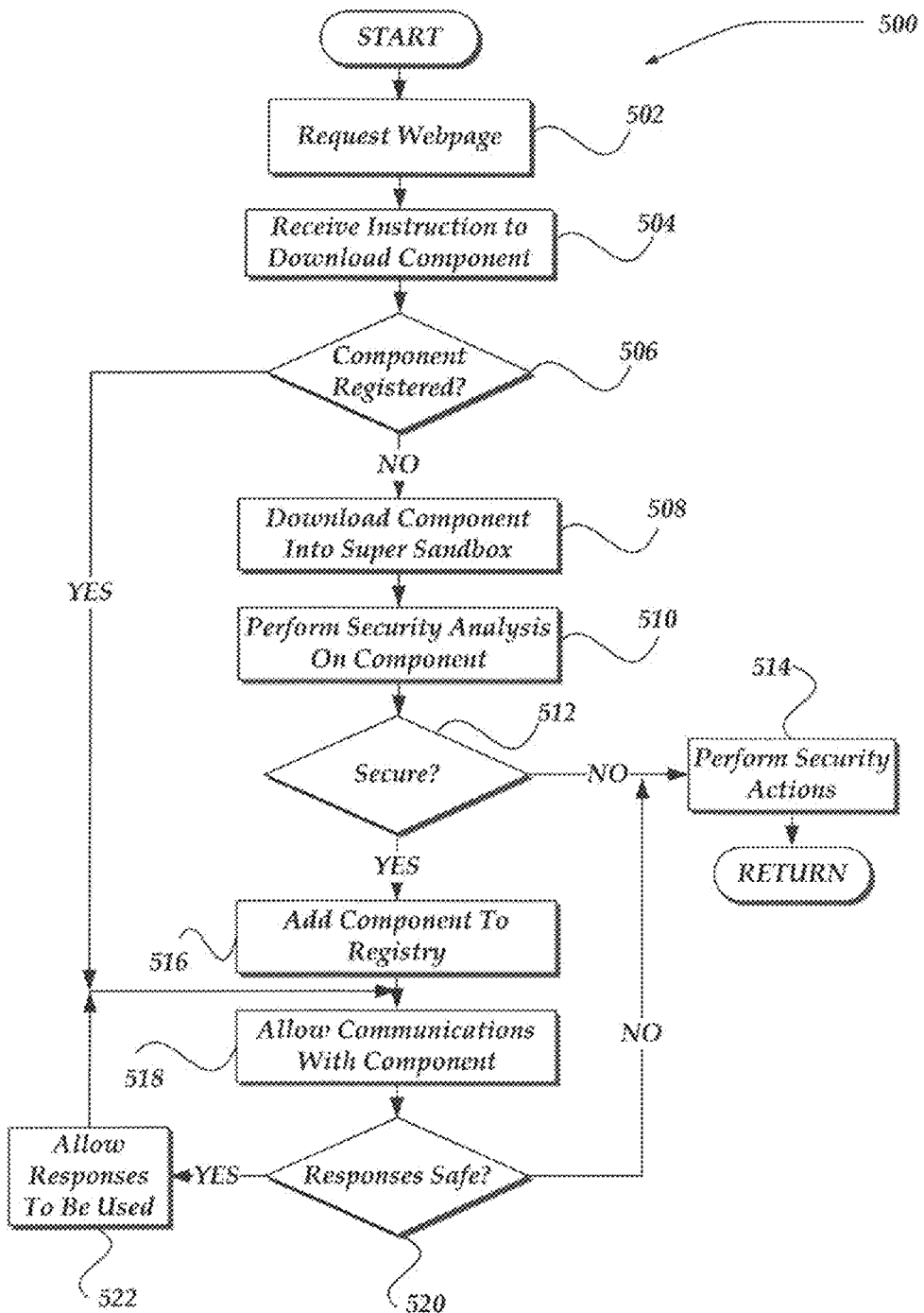
FIG. 5 illustrates a flow chart of one embodiment of a process usable to manage dynamic downloading and execution of possibly un-trusted DRM modules on a client device.

The operation of certain aspects of various embodiments will now be described with respect to FIG. 5. FIG. 5 illustrates a flow chart of one embodiment of a process usable to manage dynamic downloading and execution of possibly un-trusted DRM modules on a client device. Process 500 of FIG. 5 may be implemented within a client device, such as client device 200 of FIG. 2, for example.

Process 500 begins, after a start block, at block 502, where a request for a webpage may be made by the client device. In one embodiment, the request is performed using a browser application within the client device. It should be noted that while a webpage is mentioned, other forms usable for displaying from a network device may also be used. For example, a File Transfer Protocol (FTP) request might be made by the client device, or any of a variety of content request type of commands. Thus, subject innovations are not constrained to merely webpages; rather this is but one example of many possible mechanisms for requesting content over a network.

In any event, processing flows to block 504, where, while receiving the requested webpage (or other content), an instruction is intercepted that requests that a component be downloaded by the client device. When such instruction is received, processing flows to decision block 506, where a determination is made as to whether the component is already registered. For example, the browser might examine its registry to determine whether the component is currently registered, and therefore, determined to have already been downloaded. In some embodiments, upgrades to a component may be interpreted as not being registered. Should it be determined that the component is not currently registered, and therefore, not downloaded, processing proceeds to block 508. Otherwise, it is determined that the component is already downloaded, and processing flows instead to block 518.

At block 508, the component is automatically downloaded into a super sandbox, such as discussed above. That is, the download may occur automatically, absent additional user interactions, and thereby be done "on-the-fly." Further, it should be noted that the component downloaded might include virtually any component that might extend or add to the functionality of the browser, and/or other application within the client device. Flowing next to block 510, the super sandbox performs a plurality of security analysis on the isolated component, including checking for viruses, performing a plurality of heuristics, and the like, to determine whether the component initially appears to be trustable. For example, different requests for responses may be sent by the super sandbox to the component. The responses may then be examined by the super sandbox, and if it is determined that the responses do not appear trustable, the processing from decision block 512, might flow to block 514. Other analysis might also indicate that at decision block 512, the component is not to be trusted, in which instance, processing flows to block 514. However, if at block 510 the analysis does not appear to indicate that the component is un-trustable, processing from decision block 512 flows to block 516.

At block 514, any of a variety of security actions may be performed by the super sandbox, and/or another application within the client device. Such actions may include sending a warning message to a user, to a browser, or other application; deleting the un-trusted component (and un-registering it); increasing sandbox constraints imposed on the isolated component, or the like. In some embodiments, a level of non-trustworthiness of the component might be determined to be low enough to allow at least some interactions with the component to occur. Thus, while FIG. 5 illustrates that after block 514, the process may return, in other embodiments, processing from block 514 might instead flow to block 516.

At block 516, where the component is determined to be sufficiently secure, it is then registered for use by the browser. The address of the component is configured in a manner that directs communications with the isolated component through specific IPC interfaces, as well as to flow through the super sandbox.

Continuing to block 518, communications from a component within the client device may be directed through the super sandbox, using the IPC interfaces. For example, where a media player requests that content be decrypted, or a decryption key be obtained, such requests might be sent to an isolated component, such as a DRM module, through the super sandbox.

While not explicitly illustrated, communications sent towards the isolated component are received by the super sandbox and may also be analyzed by the super sandbox to determine whether the requests appear suspect. For example, requests to instruct the isolated component to perform actions in protected address space might be considered suspect, as might be requests to have the isolated component attempt to change the operating system, or perform other actions that might be construed as not safe. Should such a request be detected, then the super sandbox might flow to block 514, where the request might be canceled, or some other security action might be performed.

However, even where the requests are determined to be safe, the super sandbox also analyzes responses from the isolated component to determine whether the responses are safe. Thus, for example, responses that seek to modify protected addresses might be canceled, redirected to another address location or the like. For example, another temporary file system might be created into which the responses might be redirected. However, at decision block 520, should it be determined that a response is a possible security threat, processing might flow to block 514; otherwise, the process may flow to block 522, where the response may be passed by the super sandbox for use by the requesting component within the client device. Processing may then flow back to block 518.

It should be noted that process 500 may terminate at any step, based on a detected security threat by the super sandbox, and/or the browser, or other client component. Further, while process 500 illustrates one possible flow, other flows and/or steps may also be performed. For example, in other embodiments, the downloaded component, might be registered first, and then subsequently analyzed for security threats. Thus, block 516 might be performed before block 510, for example. In other instances, block 510 might be an on-going action. For example, it might be performed multiple times, even while the isolated component is servicing other requests.

In any event, it will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series, of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system, a cloud system, a multi-server system, or the like. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions, it will also be understood that each block of the flowchart illustration, and combinations of blocks in the flowchart illustration, can be implemented by special purpose hardware based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A client device, comprising:
   a network interface card to receive content over a network; and
   one or more processors that perform actions, including:
      receiving with a request for content, an instruction to download a Digital Rights Management (DRM) component onto the client device;
      automatically downloading the DRM component into a super sandbox within the client device that securely isolates communications with the DRM component;
      performing at least one security analysis on the DRM component by the super sandbox;
      when the security analysis indicates that the DRM component appears safe, registering the isolated DRM component with a registry of a browser application to extend a functionality of the browser application and to operate on behalf of requests from the browser application;
      analyzing communications with the registered DRM component and at least one application within the client device; and
      when an analyzed communication with the registered DRM component is determined to be unsafe, performing a security action on the registered DRM component.

2. The client device of claim 1, wherein when a communications with the registered DRM component is determined to be unsafe, and the communications is a response from the registered DRM component based on a request to the registered DRM component, then deleting the response from the registered DRM component.

3. The client device of claim 1, wherein performing at least one security analysis further comprises, the super sandbox sending a request to the isolated DRM component and analyzing a response from the DRM component.

4. The client device of claim 1, wherein communications with the DRM component are directed through an inter process communications interface.

5. The client device of claim 1, wherein the one or more processors that perform actions, further including:
   receiving an other instruction to download a second component onto the client device;
   automatically downloading the second component into a second super sandbox within the client device that securely isolates communications with the second component, the second component being a component configured to perform at least one of a compression/decompression action or a decryption action.

6. The client device of claim of claim 1, wherein performing a security action on the registered DRM component comprises at least one of deleting a response from the registered DRM component, sending a warning message, or deleting the registered DRM component.

7. A computer-based method, wherein a plurality of actions are performed by a processor operating within a client device, the actions comprising:
   receiving with a request for content, an instruction to download a component onto the client device;
   automatically downloading the component into a super sandbox within the client device that securely isolates communications with the component, wherein communications must flow through the super sandbox to or from the component;
   performing at least one security analysis on the component by the super sandbox;
   when the security analysis indicates that the component appears safe, registering the isolated component with a registry of a browser application, wherein the isolated component extends a functionality of the browser application and is restricted to responding to requests from the browser application or super sandbox;
   analyzing communications from the registered component; and
   when an analyzed communications from the registered component is determined to be unsafe, performing a security action on the registered component.

8. The computer-based method of claim 7, wherein when a communications with the registered component is determined to be unsafe, and the communications is a response from the registered component based on a request to the registered component, then deleting the response from the registered component.

9. The computer-based method of claim 7, wherein performing at least one security analysis further comprises, the super sandbox sending a request to the isolated component and analyzing a response from the component.

10. The computer-based method of claim 7, wherein communications with the component are directed through an inter process communications interface.

11. The computer-based method of claim 7, wherein the registered component extends the functionality of the browser application by extending a security function, a graphical function, a media function, or a compression function.

12. The computer-based method of claim 7, wherein performing a security action on the registered component comprises at least one of deleting a response from the registered component, sending a warning message, or deleting the registered component.

13. The computer-based method of claim 7, wherein the communications with the registered component includes communications between the registered component and a media player or the browser.

14. An apparatus comprising a non-transitory computer readable medium, having computer-executable instructions stored thereon, that in response to execution by a client device, cause the client device to perform operations, comprising:
   receiving with a request for content, an instruction to download a Digital Rights Management (DRM) component onto the client device;

automatically downloading the DRM component into a super sandbox within the client device that securely isolates communications with the DRM component;

performing at least one security analysis on the DRM component by the super sandbox;

when the security analysis indicates that the DRM component appears safe, registering the isolated DRM component with a registry of a browser application to extend a functionality of the browser application and to operate on behalf of requests that are restricted to be from the browser application;

analyzing communications from the registered DRM component; and when an analyzed communications from the registered DRM component is determined to be unsafe, performing a security action on the registered DRM component.

15. The apparatus of claim 14, wherein when a communications with the registered DRM component is determined to be unsafe, and the communications is a response from the registered DRM component based on a request to the registered DRM component, the deleting the response from the registered DRM component.

16. The apparatus of claim 14, wherein performing at least one security analysis further comprises, the super sandbox sending a request to the isolated DRM component and analyzing a response from the DRM component.

17. The apparatus of claim 14, wherein communications with the DRM component are directed through an inter process communications interface.

18. The apparatus of claim 14, wherein performing a security action on the registered DRM component comprises at least one of deleting a response from the registered DRM component, sending a warning message, or deleting the registered DRM component.

19. The apparatus of claim 14, wherein the client device performs operations, comprising:

receiving an other instruction to download a second component onto the client device;

automatically downloading the second component into a second super sandbox within the client device that securely isolates communications with the second component, the second component being a component configured to perform at least one of a compression/decompression action or a decryption action.

20. The apparatus of claim 19, wherein the second component is configured to perform rendering content for play by the client device.

* * * * *